United States Patent [19]

Parker et al.

[11] 4,352,590

[45] Oct. 5, 1982

[54] STABILIZATION OF ERODIBLE MARINE OR FLUVIATILE SEDIMENTS

[76] Inventors: William R. Parker; Robert Kirby, both of 3 Curdleigh La., Blagdon Hill, Taunton TA3 7SH, England

[21] Appl. No.: 215,387

[22] Filed: Dec. 11, 1980

Related U.S. Application Data

[63] Continuation-in-part of Ser. No. 47,217, Jun. 11, 1979, abandoned.

[51] Int. Cl.³ .............................................. E02B 3/12
[52] U.S. Cl. ...................................... 405/17; 405/172
[58] Field of Search .................................. 405/15–34, 405/172, 154

[56] References Cited

U.S. PATENT DOCUMENTS

| | | | |
|---|---|---|---|
| 1,359,575 | 11/1920 | Chenoweth | 405/17 |
| 2,476,682 | 7/1949 | Pickett | 405/17 |
| 3,446,027 | 5/1969 | Meijer | 405/17 |
| 3,688,510 | 9/1972 | Keating | 405/172 X |

FOREIGN PATENT DOCUMENTS

| | | | |
|---|---|---|---|
| 570879 | 9/1958 | Belgium | 405/17 |
| 2005995 | 8/1971 | Fed. Rep. of Germany | 405/17 |
| 6808349 | 12/1969 | Netherlands | 405/17 |
| 1221687 | 2/1971 | United Kingdom | 405/17 |

*Primary Examiner*—Dennis L. Taylor
*Attorney, Agent, or Firm*—Thomas J. Greer, Jr.

[57] ABSTRACT

An erodible marine or fluviatile sediment such as a sedimentary layer is stabilized by depositing on the sediment a non-setting paste-like slurry, for example, mud or clay containing a framework of gravel, using a laying head which is towed over the sea bed by a surface vessel. The slurry is mixed on the vessel and conveyed to the laying head through an underwater pipe. Distribution of the slurry from the laying head may be monitored by a television camera on the head.

14 Claims, 5 Drawing Figures

STABILIZATION OF ERODIBLE MARINE OR FLUVIATILE SEDIMENTS

This application is a continuation-in-part of our co-pending application Ser. No. 047,217 entitled Stabilisation of Erodible Marine or Fluviatile Sediments, filed June 11, 1979, now abandoned.

The present invention relates to a method, and apparatus for performing the method, of protecting submarine structures such as pipelines or oil drilling rig legs from deterioration due to the scouring effect of waves and tidal currents. This is achieved by the stabilization of erodible marine or fluviatile sediments. In particular the present invention provides a method of stabilizing a marine or fluviatile sediment which has the overriding advantage that it can be performed with precision and certainty of effect from a vessel on the surface without necessarily requiring divers to supervise the operation from the sea or river bed, although divers may be used to advantage in shallow water, or where scour is confined to a small area.

Although the present invention will be particularly described herein with reference to its use in stabilizing sediments on the sea bed it will be appreciated that the invention is applicable to any circumstances where sedimentary layers are being eroded by water movement, including river currents or waves on the sea shore.

Erosion of sedimentary layers on the sea bed may be particularly dangerous, and is certainly undesirable, in the vicinity of submarine engineering works or structures, both during construction and after completion. This is true both of permanent structures and of temporary structures and is equally applicable to offshore work such as oil drilling rigs or storage platforms as it is to works near the sea shore, such as sea walls, piers, embankments and the like.

Sediment erosion takes place when the local ambient fluid energy is sufficient to overcome both the gravitational force and any adhesive resistance of the sediment substrate, thereby acting to raise this from the sea bed and to carry it out of the area occupied by the structure resulting in the formation of a scour hole. In many areas the sea bed is naturally mobile; in quasi stable areas the hydraulic effects of local currents may be increased by the introduction of a man-made structure, and this disturbance is often sufficient to cause sediment erosion to take place where it had not previously existed. This can lead to a weakening of the foundation for such structures due to erosion of the sediment immediately around the structure; with steel or other structures this may encourage sufficient deterioration rapidly to weaken the foundations of the structure; the time taken for this situation to be reached may often be far less than the anticipated working life span of the structure. In the case of submarine oil pipelines scour is particularly dangerous since it can erode the underlying sea bed leaving sections of the pipeline unsupported, and therefore subject to flexure and liable to fracture. Moreover, any unsupported sections of a pipeline are particularly exposed and vulnerable to damage by trawls or anchors.

It has been proposed, and attempted, to stabilize an erodible sedimentary layer simply by overlaying it with a hardenable material such as concrete. Although this sometimes overcomes the immediate problem of scouring it suffers from the disadvantages that it is difficult to ensure that the concrete is applied to the correct area and, moreover, such a concrete layer frequently causes merely the geographical relocation of the primary problem, and scouring around the edges of the concrete layer takes place, sometimes to such a degree that settling of the concrete takes place thereby putting a greater strain on the pipeline or other underground structure than would otherwise be the case. Moreover, concrete is a relatively expensive material and at present can only be laid by divers so that the laying process itself is expensive and slow. Moreover, once laid, a concrete casing is difficult and expensive to remove should this become necessary for maintenance or servicing operations to be performed, and while in place constitutes a hazard for trawlers whose nets may foul beneath its outer edge. Apart from just casting a concrete jacket around the parts to be protected it has also been proposed to use precast aerofoil section concrete elements shaped to fit over an exposed pipe and to deflect flow and thereby reduce or eliminate scour. Such elements are very expensive, they are difficult and slow to lay, they are themselves liable to scour at the edges and joints and constitute a considerable hazard to trawl nets since their sharp edges may project from the sea bed. Moreover, when no longer required they would have to be recovered as they are not bio-degradable and could not simply be left in position.

Another proposal for stabilizing a substrate, without requiring artificial materials such as concrete involves overlaying the structure to be protected with what is called a "reverse filter"; this comprises layers of particulate material graded inversely, that is with the material having the smallest particle size lowermost, this being preferably of a particle size approximately the same as that of the sediment to be stabilized, and with successive overlying layers having particle sizes increasing to a much coarser grade at the top. The reverse filter is applied by depositing successively coarser layers over the erodible sediment until a particle size is reached which, in theory is able to resist the ambient fluid energy and thereby to stabilize the layers below it (this being determined, by calculations on the local submarine energy conditions). Such reverse filters, however, apart from being difficult and expensive to lay because they require many passes over each section to be stabilized, depositing successively larger particles, still do not always succeed in effecting stabilization because pressure fluctuations due to turbulence can still penetrate the open framework and suck out the underlying finer material so that such filters are nevertheless often eroded.

Other techniques which have been attempted, using both natural materials and artificial materials have met with only partial success or total failure. Such techniques include the dumping of stone from dredgers or split hopper barges to cover, and in theory to protect, the pipeline. However, there are a number of major problems associated with this technique not least of which is that the positioning of barges in deep water so that the gravel falls accurately over the pipeline or structure is very difficult. Moreover, on dumping, dispersion of the load due to the density contrast with the sea water causes a spreading "plume" of gravel during its passage to the bottom. Even if accurately placed at the surface, the material spreads widely before hitting the bottom. As a consequence very large quantities of material are required to guard against positioning errors and spread.

In addition gravel has the great disadvantage when freely dropped that it can actually damage the pipe on impact; and on reaching the sea bed individual gravel pebbles are themselves highly susceptible to scour on sand substrates. They tend to be self burying due to local accelerations of current around the pebble. Thus in areas of active currents and sediment transport, pebbles may scour and bury themselves or simply be eroded. In areas of a stable but potentially erodible sea bed with only local scour around the pipeline itself, the gravel may cause the swathe of scour to be spread laterally, thereby exacerbating the problem. Examples are occurring of companies having to pay to redredge and remove unsuccessful stone dumps.

Other artificial materials tried include plastic nets and seaweed which are stretched around offshore structures to cause local decrease in speed and carrying capacity of tidal stream which then in theory dumps its load of sediment around the structure to be protected. This requires an ambient population of mobile sediment which can be trapped (and this will not necessarily be present) and is itself non-biodegradable and may therefore be environmentally unacceptable and have to be recovered at some future date. Also, it is a hazard to ships' propellers and intakes, and is not intrinsically suitable for pipelines; moreover, it is expensive in diver time to peg around a structure offshore if precise angles are to be achieved, and susceptible to trawl and anchor damage.

Smelter slag dumped in the same way as for natural stone has been proposed. This would have the advantage of increased density and therefore greater stability, but may be environmentally unacceptable as minor and major elements (Iron, Nickel, Copper, Tin, Zinc, Lead, Cadmium, Vanadium, Chromium) may be leached from slag by chemical or biological processes common to all sea areas thus causing pollution problems.

Large slabs of bitumen contained in plastic or other covers have also been proposed. The object is to lay these over the pipe when they will mould themselves to the shape of the pipe and sea bed irregularities. However, they are expensive in raw materials, can only be laid individually by divers and are therefore expensive and slow to lay, liable to scour around the edges and could ultimately be undercut and then bear down on the pipe. Also, being non-biodegradable they may have to be recovered at some future date. All of the above proposals, as well as one for laying large plastics sacks to be filled subsequently with concrete have failed to solve satisfactorily and economically the important problem of sediment scour.

The technical problem which the present invention seeks to solve is that of providing a method of stabilizing a marine or fluviatile sediment, which overcomes the disadvantages inherent and discussed in the use of any of the known techniques on the proposals outlined above. The present invention also comprehends apparatus for performing the method.

According to the present invention there is provided a method for stabilizing an erodible marine or fluviatile sediment by depositing directly over it a slurry of a non-setting paste-like or colloidal matrix material incorporating a framework of particles of a solid material having a particle size greater than 2 mm. least dimension but less than 100 cm. least dimension.

Advantageously the paste-like or colloidal matrix material is mud or clay; alternatively an artificial material may be used. Such artificial material could be compounded from industrial waste materials and may require heating or other processing to bring it to the required consistency for use in the subaqueous environment involved.

In the conditions of use, mud or clay is non-setting, but there are certain conditions, namely when used to protect an oil pipeline which attains a high temperature due to the high temperatures of the oil flowing in it, that the mud or clay may harden at least in the regions immediately adjacent the heated surface of the pipeline. The hardened clay or mud will grade into water saturated soft clay or mud progressively throughout the thickness of the protective layer and offers increased protection against damage by anchors, trawl nets, beam trawls or seine net gear. Moreover, the hardened mud or clay will help to restrict heat loss from the oil in the pipeline and the material will physically strengthen the pipeline.

Ground, pelleted clay, of a naturally high density is suitable, having advantages in transport and handling over wet material. Wet material may be extruded through a disc with one inch diameter perforations, either prior to transport, or immediately prior to mixing with the solid particles.

In general terms, partly processed brick clay is ideal, but has various transport cost problems. Ordinary boulder clay or post-glacial clay can also be used if treated by the above-mentioned extrusion process. Natural local sea bed clay can also be used but may have to be extruded, particularly if it is overconsolidated, or alternatively may need to be densified.

The advantages of the present invention are that it will prevent scour if laid prior to the erection of a structure or laying of a pipeline, and will also halt scour which has already started. Moreover, it is able to support unsupported sections of pipe (spans) caused by scouring and it is environmentally compatible being composed of entirely natural materials. A stabilizing layer formed according to the invention has long term natural stability of structure and materials and is entirely compatible with other uses of the sea bed, such as fishing.

In the performance of the method the slurry is transported to the required position over the marine sediment to be stabilized by pumping it through an underwater pipeline having a fixed or a movable laying head by means of which the slurry is spread over the sediment. The method is performed in such a manner that the slurry is deposited in the position it will occupy over the sediment and will not normally be moved from this position subsequent to deposition, apart from a minor redistribution of slurry using a special distribution head or sea bed plough, which may be required on some occasions to level the slurry surface.

The matrix material may be flocculated prior to admixture of the particles. The matrix and the particles may be admixed to form the slurry immediately prior to pumping the slurry over the sediment to be stabilized, or may be mixed previously and subsequently transported to the area to be stabilized in this form. On the other hand, transporting the mud or clay dry has certain definite advantages and it has been found that for convenient transport pellets of dried clay or mud may be used.

For purposes of description, the particles which form the framework of the slurry in accordance with this invention will be identified hereinafter as gravel. By gravel, it is meant solid particles greater than 2 mm. in least dimension but less than 100 cm. least dimension, of arbitrary shape, composed of natural or treated or artificially combined, rock or rock-forming minerals, including silicate or carbonate or phosphatic minerals and including such materials as crushed granite, crushed limestone, crushed sandstone, crushed brick, crushed concrete, crushed shells, crushed coral, natural river or beach or lake small stones, coral rocks and shells, and crushed slag, but not specifically limited thereto except for particle size.

The gravel particles should be larger than the grain size of the erodible sediment and may be of any relatively dense material, although conveniently stones are used since these are readily available in a marine environment.

It has been found that after it is laid the slurry is sometimes eroded slightly as the mud gradually de-waters, but during the de-watering stage the mud acts as a baffle to the pressure differences normally operating across the surface of porous sediments and thus, although the upper surface layers may be stripped, the matrix is not removed below one or two grain thicknesses of the embedded particles and can therefore act physically to bind the particles together in a framework the interstices of which are filled by the matrix.

The consistency of the matrix must be such that it is compatible with the rapid attainment of high cohesion and for this purpose high specific gravity drilling muds are eminently suitable. The use of chemically inert matrix materials is to be preferred to avoid the desorption of toxic chemicals from the mud in areas of ecological risk, such as fish nursery areas. In certain circumstances it has been found that a suitable density for mud to be used as the matrix material immediately prior to admixture with the particulate material is 1.3 grams/cc.

The present invention also comprehends apparatus for performing the method outlined above, comprising a container for the particulate material, a container for the matrix material, means for mixing the matrix and the particulate materials together, a pump capable of operating to pass the particles and the matrix, and a pipeline for directing the slurry from the pump to the required position over the sediment to be stabilized.

The apparatus preferably also includes a laying head designed to carry the pipe outlet and operative to flatten and spread the slurry delivered therefrom over a selected width of the sea bed. The laying head may also be provided with means for flattening, at least partly, the sea bed immediately prior to laying the slurry.

Although the layer of slurry does not immediately attain its greatest resistance to erosion, it is immediately more resistant to erosion than the erodible sediment it covers and, accordingly, it will be found that it is usually only necessary to lay a relatively thin layer of the slurry in order to provide the necessary stabilizing effect. In order to cover the area to be stabilized the laying pipeline may be trailed from a vessel carrying the containers of matrix and particulate material, and the vessel may move in a series of parallel lines, taking account of any surface currents to ensure that the laying head at the end of the pipeline is drawn along successive parallel lines over the area to be stabilized. The laying head serves, when covering an extended area, to spread the slurry to form a layer with a substantially planar surface. Alternatively, for covering exposed pipelines, the vehicle may form the slurry into a wedge completely covering the pipe, it may also be provided with control and/or monitoring systems, such as T.V. cameras as well as a remotely controlled positive traction system enabling it to have a certain degree of autonomy and independence of positioning with respect to the vessel.

A suitable construction for the or each laying pipeline comprises a flexible outer casing with an internal effectively flexible screw, although if the outer casing is of sufficiently large diameter in relation to the particle size the screw can be dispensed with. The screw, if provided, is driven to rotate whereby to effect transfer of the slurry longitudinally of the pipeline, and to assist in maintaining this in a thoroughly intermixed condition prior to deposition onto the sediment to be stabilized.

The screw may be made from a resilient material so that it is truly flexible, or may alternatively be formed as a plurality of sections joined together end to end by flexible couplings or universal joints. This allows the outer casing to flex although the material of the screw is not itself flexible.

It is preferred that there are provided means for monitoring and adjusting the density of the matrix material prior to its admixture with the particulate material. Adjustments to the density may be made by flocculating the material, or by varying the water content, particularly if mud is used.

The laying head at the lower end of the pipeline may take a number of different forms. In a simple embodiment it may comprise a pair of substantially parallel skids interconnected by cross members which support the end of the laying pipeline. The transverse supports may be formed as or may carry inclined deflectors for deflecting the slurry emerging from the deposition head laterally outwards as the distribution head is drawn over the surface to be stabilized. Alternatively, the laying head may be incorporated in a tracked or wheeled vehicle connected to the vessel but not towed thereby, rather being locomotive.

The present invention also comprehends a sediment stabilizing layer when made by the method of this invention and/or by the apparatus of this invention.

Reference will hereinafter be made to the accompanying drawings which schematically illustrate the performance of the invention.

Figure 1:
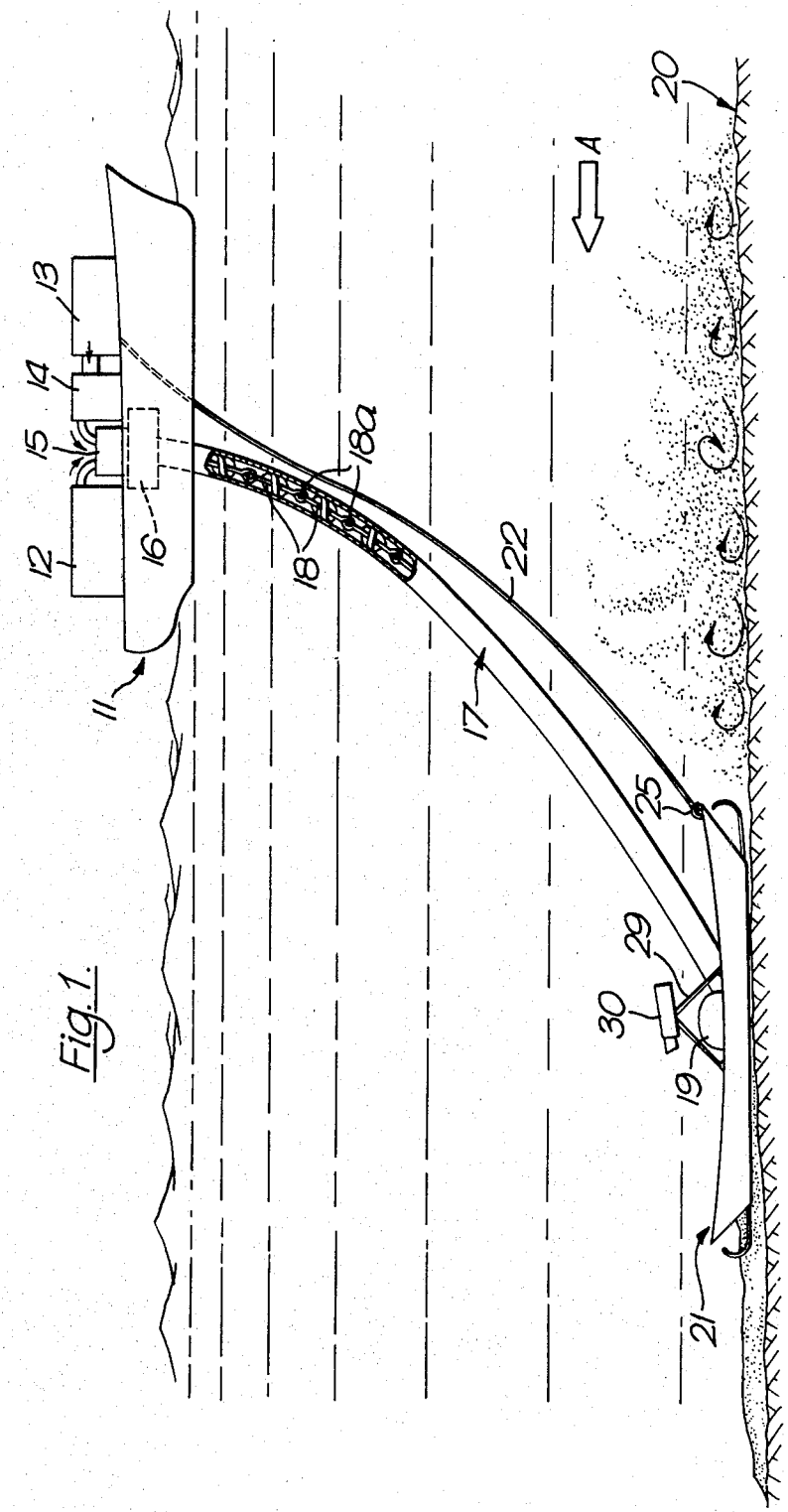
FIG. 1 is a side view of apparatus according to the invention for laying a stabilizing layer onto a sea bed floor.
Figure 2:
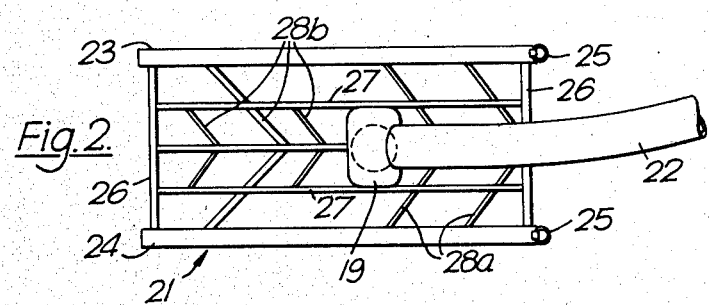
FIG. 2 is a plan view of a laying head which forms part of the apparatus illustrated in FIG. 1.

Referring to FIGS. 1 and 2 of the drawings there is shown a vessel, generally indicated 11, carrying two containers 12, 13, in the former of which is carried a particulate material such as gravel, and in the latter of which is carried a matrix material such as mud.

Adjacent the latter container 13 is a tank 14 in which the density of the mud can be monitored and adjusted, and this has an outlet to a mixing chamber 15 to which also the particulate material in the gravel container 12 can be fed. From the mixing chamber 15 the slurry formed therein is driven by a pump 16 to a pipeline 17 having a chain of screw links 18 located internally and an outer flexible cover. At the lower end of the pipeline 17 is a deposition head 19 carried on a laying head or sea bed plough 21 which will be described in greater detail below.

In the illustration it will be seen that the vessel is drawing the laying head 21 by means of a towing cable 22 over a sedimentary layer 20 which is shown as being disturbed and eroded by a current generally indicated by the arrow A. As the slurry of mud and gravel is deposited over the sedimentary layer 20 it acts to stabilize this against further erosion even though a small amount of the mud fraction may be stripped away by the current.

The sea bed plough 21 comprises two parallel skids 23, 24 joined by transverse struts 26, which in turn are linked by two longitudinal ribs 27 to form a support structure on which the deposition head 19 is carried. The forward ends of the skids 23, 24 are joined by respective coupling points 25 to the towing cable 22 which also supports an electrical cable for a monitoring and control system indicated schematically as a television camera 30 mounted on a tripod 29 on the support structure on the sea bed plough where it can scan the slurry being deposited by the deposition head 19. The longitudinal ribs 27 carry a number of ground plane deflectors 28a and slurry deflectors 28b; the former act to spread and level the sediment to be stabilized and the latter act to spread the slurry laterally as it is deposited, to ensure a uniform distribution of the slurry layer in a wide strip with a substantially planar surface.

For covering a pipeline, however, a sea bed tractor or a neutrally buoyant vehicle may be used. Such vehicles may be provided with dynamic thrust positioning means and can be computer controlled from instruments serving to trace the pipeline to be covered. The laying vessel can be similarly dynamically positioned or may be lying to several anchors.

Although a single pipeline 17 is shown in FIG. 1, it will be appreciated that to obtain a greater spread from a single pass by the vessel, and a greater control of the laying process, a plurality of laying pipes may be used simultaneously such plurality of pipes may distribute slurry to a single sea bed plough or distribution vehicle, or to a plurality of such ploughs and/or sea bed vehicles.

The pumps used to distribute the slurry may be capable of pumping the dry components, or the dry mixture, or the mixture when wetted or saturated and may be driven electrically, hydraulically, pneumatically or in any other known way.

Figure 3:
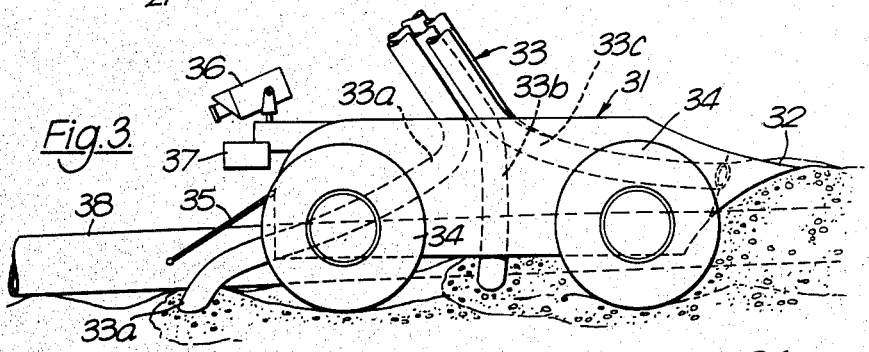
FIG. 3 is a side view of a part of alternative apparatus according to the invention for laying a stabilizing layer onto a sea bed floor.
Figure 4:
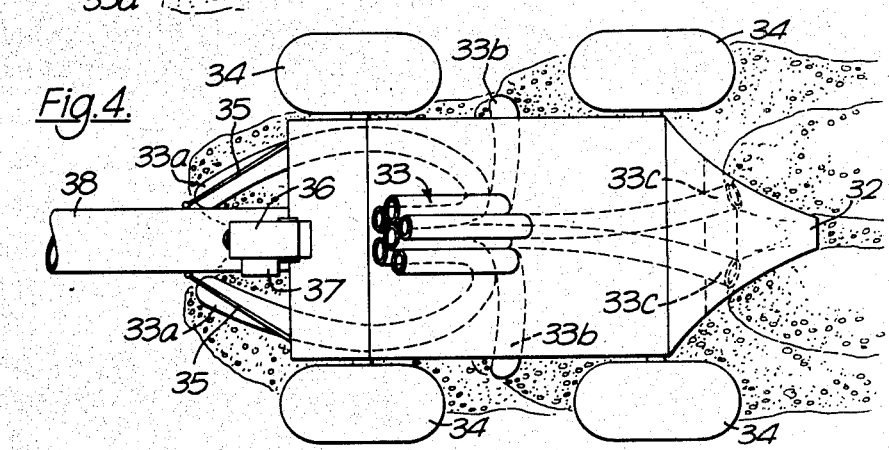
FIG. 4 is a plan view of the apparatus shown in FIG. 3.
Figure 5:
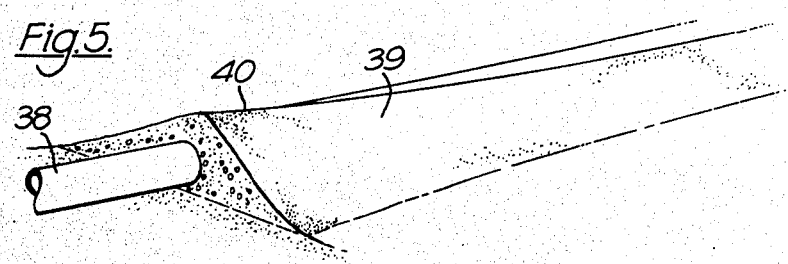
FIG. 5 is a schematic perspective view of a subaqueous pipeline covered with a stabilizing coat in accordance with the invention.

Referring now to FIGS. 3, 4 and 5, there is shown a slurry distribution vehicle generally indicated 31 having four large wheels 32 each independently driven by a separate motor (not shown). A bundle of six delivery pipes 33 leading from a vessel, such as the vessel 11 illustrated in FIG. 1, conveys the mixed slurry in accordance with the invention to the vehicle 31.

At the vehicle 31 the six pipes 33 are separated into two pairs, the first or forward pair 33a are led forwardly of the vehicle and have curved outlets leading to either side of an exposed pipeline 38 to be covered.

The vehicle 31 is particularly adapted to straddle the pipeline 38 and has automatic tracking equipment to permit it to follow the line of the pipe without deviating. Such equipment includes feelers 35 projecting forwardly of the vehicle and providing an electrical signal representing the position of the pipeline with respect to the front axle of the vehicle, automatic control equipment within the vehicle then controlling the motors which independently drive each of the wheels 34 to maintain the vehicle in a predetermined position straddling the pipeline. In addition, a T.V. camera 36 and magnetometer 37 are provided to sense the position of the pipeline and provide extra feed-back information on its position with respect to the vehicle 31 to maintain the position of the vehicle 31 accurately.

The forward pair of outlets 33a of the pipes 33 curve around close to the ground line so that they deposit the slurry underneath the pipeline in places where the irregularities of the sea bed leave sections unsupported and spanning between adjacent hillocks.

A further two outlets 33b of the pipes 33 lay slurry to either side of the exposed pipeline to build up the level of the sea bed on either side of this, the outlet pipes 33b being positioned between the forward pair of wheels 34 and the rear wheels 34 of the laying vehicle.

Finally, the remaining two pairs of pipelines have outlets 33c which lay directly on top of the pipeline 38, and on top of the slurry which has been laid by the two pairs of outlets discussed above and the vehicle has a rear hood 32 which shapes the deposited slurry into a general triangular cross sectional shape as can be seen in FIG. 5, the deposited strip having inclined sides 39 and a crest ridge 40.

By using a bundle of six pipes each of 0.3 meters in diameter it is possible to achieve a total delivery rate at the sea bed in the region of 2 cubic meters of material per second (that is 0.3 cubic meters per second per pipe). The vehicle would then move at the rate of advance in the region of 1 meter every 5 seconds since it is envisaged that for the larger pipelines (that is pipelines in the region of 1 meter diameter) it will be necessary to deposit approximately 10 cubic meters of material to cover each 1 meter length of the pipe, forming a wedge of sediment over the pipe and burying the pipe to a depth of at least 1 meter. The wedge of material laid over the pipe would extend to a distance in the region of five pipe diameters to either side of the pipeline so that the sloping sides 39 have a suitably shallow angle when compacted to provide minimum obtrusion above the sea bed and to act as a ramp for any ships' anchors or trawls or seine nets thereby protecting the pipeline from damage by these.

MIXTURE

The composition of the mixture of the slurry depends upon the porosity of a unit volume of the framework particles and the density of the matrix material. The porosity of the framework depends on its size distribution. Thus the ratio of the volume of framework material to the volume of matrix material may vary over a relatively wide range generally varying from 1:5 to 5:1. Especially good results have been obtained with ratios of 3:1, 3:2 and 1:3, although it will be readily apparent that depending upon the specific particles of the gravel and the muds used, other ranges will be effective. It is also to be understood that depending upon differing sea bed conditions, the proportions may be varied within the general range of 1:5 to 5:1.

We claim:

1. A method of stabilizing an erodible marine or fluviatile sediment comprising the steps of depositing directly over the sediment to be stabilized a slurry comprising a framework of rigid particles greater than 2 mm. least dimension and less than 100 cm. least dimension in generally touching relation and a non-setting paste-like or colloidal matrix material filling voids between particles of said framework.

2. The method of claim 1 wherein said particles are gravel.

3. The method as in claim 1, wherein the slurry is transported to the required position over the sediment to be stabilized by pumping it through a movable underwater laying head having a pipe through which slurry is passed from a surface vessel to be spread over sediment to be stabilized.

4. The method as in claim 3, wherein the matrix and the particles are admixed to form the slurry which is then pumped through the pipe to the sediment to be stabilized.

5. The method as in claim 1, wherein that the matrix material is flocculated prior to the admixture therewith of said solid particles.

6. The method as in claim 1, wherein the matrix material comprises mud or clay and the particles comprise gravel.

7. The method as in claim 1, wherein the matrix material and the particulate material are present by volume in the slurry in a ratio of from 1:5 to 5:1.

8. The method as in claim 1, wherein the matrix material and the particulate material are present by volume in the slurry in a ratio of from 1:3 to 3:1.

9. The method of claim 1, wherein said particles are selected from stones and crushed rock.

10. The method of claim 1, wherein said particles are selected from stones and crushed rock and the matrix is a mud.

11. The method of claim 3, wherein the outlet end of the pipe is directly over sediment to be stabilized.

12. The method of claim 1, wherein the slurry is transported to the required position over the sediment to be stabilized by pumping it through a movable underwater laying head having a plurality of pipes through which slurry is passed to be spread over sediment to be stabilized, the pipes including a first pair for applying slurry in two transversely spaced first lines, a second pair for applying slurry in two spaced second lines transversely outwardly of and in partially overlying relation to said first lines, and at least one further pipe for applying slurry between said first lines.

13. A method according to claim 12, wherein a pipeline resting on the sediment is being covered and protected and wherein said first lines are on opposite sides of the pipeline.

14. A method according to claim 12, wherein a pipeline resting on the sediment is being covered and protected and wherein said first lines are on opposite sides of the pipeline and angled to direct slurry generally below the pipeline.

* * * * *